(12) United States Patent
Smith et al.

(10) Patent No.: US 6,280,822 B1
(45) Date of Patent: Aug. 28, 2001

(54) CUBE CORNER CAVITY BASED RETROEFLECTORS WITH TRANSPARENT FILL MATERIAL

(75) Inventors: Kenneth L. Smith, White Bear Lake; Gerald M. Benson, Woodbury; James C. Coderre, Lake Elmo; Cheryl M. Frey, White Bear Lake; Bruce B. Wilson, Woodbury; Michele A. Craton, Cottage Grove; Michael P. Daniels, Inver Grove Heights; Roger E. Luehrs, Arden Hills, all of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/228,367

(22) Filed: Jan. 11, 1999

(51) Int. Cl.[7] ............................. B32B 3/00; G02B 5/122
(52) U.S. Cl. ...................... 428/161; 428/41.7; 428/41.8; 428/164; 428/913; 359/529
(58) Field of Search ........................ 428/192, 172, 428/141, 148, 161, 164, 913, 41.7, 41.8, 42.1, 343; 359/529, 530

(56) References Cited

U.S. PATENT DOCUMENTS

| Re. 24,906 | 12/1960 | Ulrich | 206/59 |
| 2,380,447 | * 7/1945 | Jungersen | 359/547 |
| 3,396,639 | 8/1968 | Lemelson | 14/1.5 |

(List continued on next page.)

FOREIGN PATENT DOCUMENTS

| 16 46 235 | 7/1971 | (DE) . |
| 06811 | 7/1989 | (WO) . |
| 11464 | 4/1995 | (WO) . |
| 34302 | 10/1996 | (WO) . |
| 05509 | 2/1997 | (WO) . |
| 12581 | 3/1998 | (WO) . |

OTHER PUBLICATIONS

*Textbook of Polymer Science*, Fred W. Billmeyer, Jr., Wiley–Interscience (Second Edition, 1971) pp. 84–85.
ASTM D882–97 Standard Test Method for Tensile Properties of Thin Plastic Sheeting (1997).

Primary Examiner—Donald J. Loney
(74) Attorney, Agent, or Firm—Rudolph P. Hofman, Jr.

(57) ABSTRACT

Retroreflective sheeting includes a body layer having a structured surface with recessed faces forming cube corner cavities. A reflective film is disposed at least on the recessed faces, and a fill material fills the cube corner cavities. The fill material comprises radiation-curable materials, adhesives, or both, and preferably transparent radiation-curable pressure-sensitive adhesives. The fill material preferably forms a continuous layer covering both the recessed faces and upper portions of the structured surface. A transparent cover layer preferably contacts the fill material layer.

21 Claims, 3 Drawing Sheets

U.S. PATENT DOCUMENTS

| | | | |
|---|---|---|---|
| 3,684,348 | * 8/1972 | Rowland | 350/103 |
| 3,689,346 | 9/1972 | Rowland | 156/245 |
| 3,712,706 | 1/1973 | Stamm | 350/103 |
| 3,716,445 | 2/1973 | Lemelson | 161/2 |
| 3,810,804 | 5/1974 | Rowland | 156/245 |
| 3,822,158 | 7/1974 | Hoffman et al. | 156/98 |
| 3,935,359 | 1/1976 | Rowland | 428/172 |
| 4,127,693 | 11/1978 | Lemelson | 428/163 |
| 4,181,752 | 1/1980 | Martens et al. | 427/54.1 |
| 4,329,384 | 5/1982 | Vesley et al. | 428/40 |
| 4,330,590 | 5/1982 | Vesley | 428/336 |
| 4,489,107 | 12/1984 | Pech | 427/162 |
| 4,576,850 | 3/1986 | Martens | 428/156 |
| 4,656,072 | 4/1987 | Coburn, Jr. et al. | 428/40 |
| 4,703,999 | 11/1987 | Benson | 350/103 |
| 4,737,559 | 4/1988 | Kellen et al. | 526/291 |
| 5,122,902 | 6/1992 | Benson | 359/529 |
| 5,175,030 | 12/1992 | Lu et al. | 428/30 |
| 5,189,553 | 2/1993 | Smith | 359/530 |
| 5,376,431 | 12/1994 | Rowland | 428/164 |
| 5,602,221 | 2/1997 | Bennett et al. | 426/307.7 |
| 5,637,646 | 6/1997 | Ellis | 525/309 |
| 5,657,162 | 8/1997 | Nilsen et al. | 359/530 |
| 5,670,096 | 9/1997 | Lu | 264/1.1 |
| 5,691,846 | 11/1997 | Benson, Jr. et al. | 359/530 |
| 5,711,993 | 1/1998 | Lein et al. | 427/250 |
| 5,734,501 | 3/1998 | Smith | 359/530 |
| 5,753,768 | 5/1998 | Ellis | 525/309 |
| 5,754,338 | 5/1998 | Wilson et al. | 359/530 |
| 5,763,049 | * 6/1998 | Frey et al. | 428/172 |

* cited by examiner

CUBE CORNER CAVITY BASED RETROEFLECTORS WITH TRANSPARENT FILL MATERIAL

CROSS REFERENCE TO RELATED APPLICATION

The present invention relates to U.S. application Ser. No. 09/227,963, "Cube Corner Cavity Based Retroreflectors and Methods For Making Same", filed on even date herewith and incorporated by reference.

BACKGROUND

The present invention relates generally to retroreflective articles such as sheeting. More particularly, the invention relates to such articles or sheetings in which retroreflective elements comprise reflective faces arranged to form a cavity.

The reader is directed to the glossary at the end of the specification for guidance on the meaning of certain terms used herein.

Cube corner retroreflective sheetings can generally be categorized as those that use a rear-surface body layer and those that use a front-surface body layer. Commercially available cube corner retroreflective sheetings are of the former type, in which a thin transparent body layer has a substantially planar front surface and a rear structured surface comprising a plurality of geometric structures of pyramidal shape, some or all of which include three reflective faces configured as a cube corner element. Light is incident on the planar front surface, passes through the thickness of the body layer, and is retroreflected by the cube corner elements back through the front surface. In some known embodiments, a reflective coating such as aluminum is applied to the rear structured surface, followed by an adhesive layer that covers and conforms to some extent to the shape of the structured surface. However, in general no reflective coating is required so long as a clean air interface can be maintained at the structured surface, in which case reflections occur by total internal reflection.

Some known cube corner retroreflective sheeting constructions use a front-surface body layer, in which the body layer has a front structured surface. See, e.g., U.S. Pat. No. 3,712,706 (Stamm), U.S. Pat. No. 4,127,693 (Lemelson), and U.S. Pat. No. 4,656,072 (Coburn, Jr. et al.), and PCT Publication WO 89/06811 (Johnson et al.). The front structured surface comprises a plurality of reflective faces arranged to form cube corner cavities. For this reason such retroreflective sheeting is referred to herein as cube corner cavity based retroreflective sheeting. A thin metal film can be applied to the structured surface to enhance reflectivity of the faces. Incident light does not penetrate through the body layer but rather is reflected by the faces forming the cube corner cavities. In some embodiments a cover layer that does transmit incident light is provided on top of the structured surface to protect the cavities from dirt or other degradation, with portions of the cover layer extending into and filling in the cube corner cavities of the structured surface. In other embodiments a cover layer is sealed or adhered to the structured surface by a colored pressure- or heat-sensitive adhesive that cancels, removes, or obliterates retroreflectivity of the structured surface.

One advantage of cube corner cavity-based retroreflective sheeting is the ability to use a much wider variety of material compositions for the body layer than is otherwise possible, since it need not be optically clear. Another advantage is the ability to form certain types of structured surfaces in the body layer more rapidly than it takes to form a negative copy of such structured surfaces in rear-surface body layer constructions. This is because molds used to form the structured surface of a front-surface body layer can have grooves that are essentially unbounded in the direction of the groove. In contrast, molds used to form the structured surface of a rear-surface body layer typically have an array of closed (cube corner) cavities bounded by a plurality of inverted grooves, i.e., ridges. The unbounded grooves of the former molds are easier to fill with body layer material than the array of closed cavities provided on the latter molds.

Unfortunately, this latter advantage can be essentially nullified in constructions where the cube corner cavities in the body layer are filled with a transparent substance. Filling the cavities with such a substance, referred to as a fill material, is desirable to increase the entrance angularity of the sheeting by refracting highly off-axis incident light closer to the symmetry axis of the cube corner element, as well as to keep dirt or other debris out of the cavities. But such filling is undesirable insofar as it requires forcing material into an array of closed cavities. Such filling is also undesirable to the extent it exposes the body layer to excessive heat, mechanical stress, or other process conditions that could compromise the fidelity of the structured surface.

Constructions of the type described would benefit from fill materials having properties that make them easy to fill into the cube corner cavities of the body layer, preferably with minimal risk of damaging the fidelity of the structured surface. Preferred fill materials should be compatible with relatively low cost, high flexibility, and high visibility sheeting constructions.

BRIEF SUMMARY

Certain radiation-curable materials, particularly radiation-curable pressure-sensitive adhesives, have been found to exhibit significant manufacturing and/or construction advantages when used as fill materials for cube corner cavity based retroreflective sheeting.

Retroreflective articles are disclosed having a body layer with a structured surface in which recessed faces define cube corner cavities. A transparent adhesive material fills the cube corner cavities. The adhesive material is preferably a pressure-sensitive adhesive. In one embodiment, a release liner covers the fill material. In another embodiment, a transparent cover layer takes the place of the release liner. The cover layer adds durability to the article, and can also incorporate dyes, colorants, or the like to affect the appearance of the sheeting or to convey information.

Methods are disclosed in which a film of reflective material is applied at least to recessed faces of a body layer structured surface, such recessed faces forming cube corner cavities. A flowable composition such as a resin is applied to the structured surface. The composition is one suitable for forming a transparent PSA, or one that is radiation curable and suitable for bonding to the film of reflective material, or, preferably, both. After the composition has substantially completely filled the cube corner cavities, the composition is crosslinked or otherwise cured by exposure to radiation such as UV light. After the exposure step, the crosslinked composition bonds to the reflective film and preferably also to a transparent cover layer.

To reduce cost while maintaining functionality and durability, the constructions preferably utilize thermoplastic materials for the body layer and the cover layer. Good flexibility of sheeting articles can be aided by the use of fill materials whose elastic modulus after crosslinking is less than about 50,000 psi (345×10⁶ Pascals), and preferably less than about 25,000 psi (172 MPa).

BRIEF DESCRIPTION OF THE DRAWINGS

In the drawings, the same reference symbol is used for convenience to indicate elements that are the same or that perform the same or a similar function.

DETAILED DESCRIPTION OF THE ILLUSTRATIVE EMBODIMENTS

Figure 1:
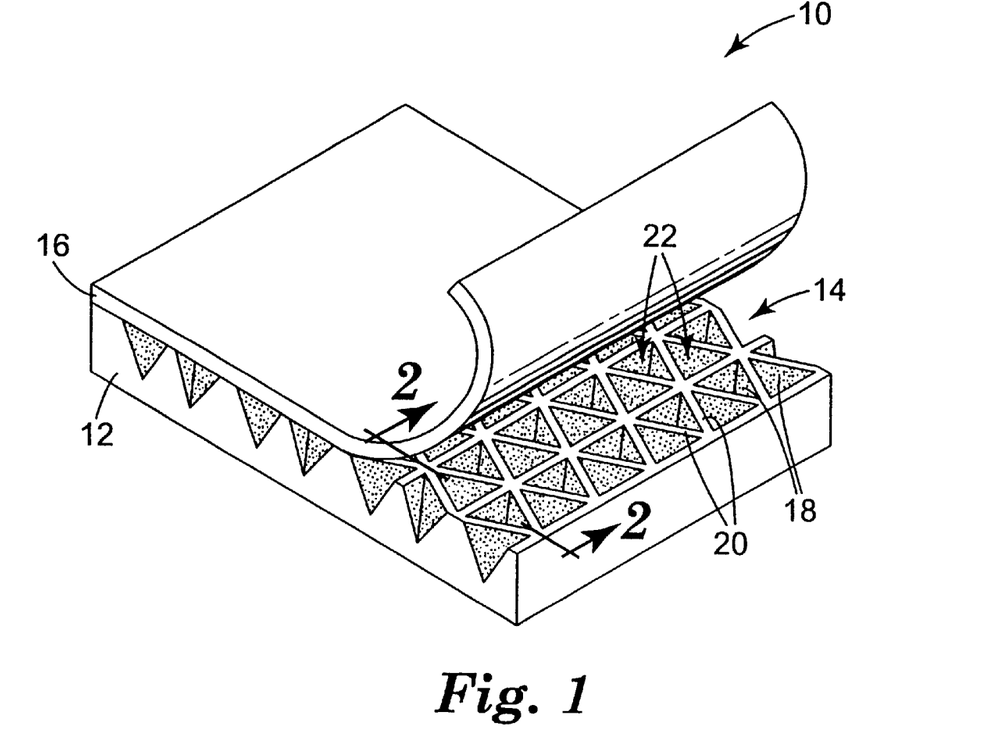
FIG. 1 is a perspective view of a retroreflector where a top cover layer thereof is shown only partially laminated to a body layer to reveal cube corner cavities formed in the body layer.

In FIG. 1, a portion of a retroreflective sheeting 10 is shown enlarged. Sheeting 10 comprises a body layer 12 having a structured surface 14, and a transparent cover layer 16. Structured surface 14 includes recessed faces 18 and top surfaces 20, the recessed faces 18 forming cube corner cavities 22. The recessed faces 18 are shown shaded for visual effect. In a preferred construction, a vapor-coated film of reflective material such as aluminum, silver, or the like is exposed on the recessed faces but masked on top surfaces 20, whether by the absence of such reflective material or the presence of a masking material on the top surfaces. Alternatively, the film of reflective material can be exposed on both faces 18 and surfaces 20, but the surfaces 20 are physically roughened to impart a diffuse reflectivity to the film. In still another alternative, top surfaces 20 can be eliminated by allowing the recessed faces to converge or intersect along sharp edges.

Figure 2:
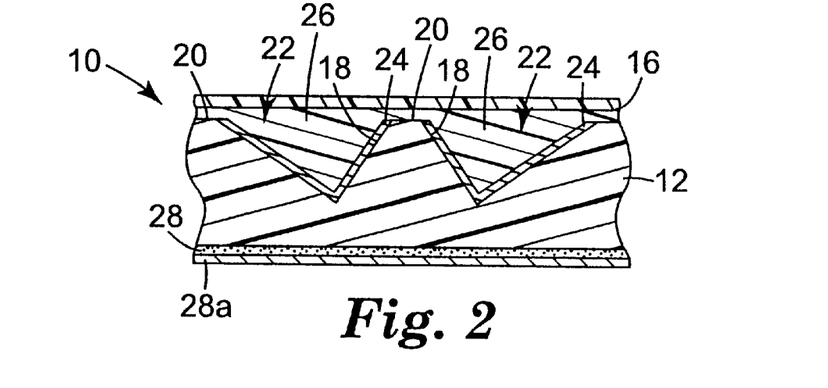
FIG. 2 is a cross-sectional view of a portion of the retroreflector of FIG. 1 taken along line 2—2, and additionally showing a fill material filling the cube corner cavities and bonding the cover layer to the body layer.

FIG. 2 shows a sectional view of a portion of the sheeting 10, additionally showing a discontinuous film 24 of reflective material on the recessed faces 18, and a fill material 26 that fills cube corner cavities 22. Fill material 26 is preferably sufficiently transparent to allow light rays to propagate through it with minimal degradation of retroreflective efficiency. In contrast to known constructions, fill material 26 forms a strong bond not only with transparent cover layer 16 but also with film 24 and with any exposed portions of body layer 12. Thus, fill material 26 is preferably coextensive with the structured surface 14 and, for ease of construction, forms a substantially continuous layer that covers both the recessed faces and the top surfaces of the structured surface. In an alternative embodiment the fill material can be coextensive with structured surface 14 but discontinuous, encapsulated by a network of bonds directly between cover layer 16 and top surfaces 20. This may be advantageous where, for example, a direct bond between the cover layer and the body layer can be made stronger than one in which the fill material and/or the reflective material are interposed. However, embodiments having a continuous fill material layer are preferred in part because the construction process is more robust by avoiding the stringent requirement of having to apply a precise amount of fill material to the structured surface—just enough to substantially fill the cavities, but not so much that the fill material covers the upper portions of the structured surface in a way that interferes with the network of bonds between the cover layer and upper portions of the body layer. The continuous fill material layer embodiments also allow the fill material to flow from one cube corner cavity to another before the fill material is solidified by cross-linking. Finally, in constructions where the fill material functions as a bonding agent between the body layer and the cover layer, a continuous fill material layer improves bond strength by increasing the surface area of the bond.

Market demands often require sheetings of various colors for different applications, or sheetings that have symbols or other indicia. These distinctive visual effects can be realized by adding colorants, dyes, or the like to cover layer 16 as is known. Manufacturing, inventory, and storage costs become a consideration when a variety of different sheetings each having different cover layers 16 must all be manufactured and stored in sufficient quantity so that each type will be available upon receipt of an order. It has been found that cube corner cavity-based sheeting that uses a PSA as the fill material has surprising versatility that can be used to reduce these costs. In particular, the body layer, reflective film, and the fill material can all be prepared, but then instead of applying the transparent cover layer 16, a standard release liner is laminated to the fill material. The release liner need only protect the fill material (the PSA) from contamination during storage until a particular type of sheeting is called for. At that time, the release liner is stripped and the appropriate cover layer is applied to the sheeting in a simple lamination process.

Heat-activated adhesives can be used as the fill material with similar beneficial results. Examples of such adhesives are Nucrel brand ethylene acid copolymer resins, sold by E. I. du Pont de Nemours and Company. An advantage of heat-activated adhesives is that the release liner can in some cases be eliminated from the construction. The intermediate sheeting, without the cover layer and without a release liner, can be stored in a roll under standard storage conditions without adhering to itself. A disadvantage is that the sheeting must be heated to activate the adhesive properties when the cover layer is applied.

A PSA or heat-activated adhesive can also be used as the fill material in applications where no cover layer is required. For example, it may be desirable to apply the front side of the sheeting to a transparent substrate such as window glass in a vehicle or a building. The sheeting thus retroreflects light incident from the opposite side of the window glass. For such applications a sheeting with a transparent PSA fill material and a release liner is particularly well suited.

For most other applications, sheeting 10 preferably includes another thin adhesive layer 28 on the back side of body layer 12 so the sheeting can be applied to a substrate of interest. Where layer 28 is a PSA, another release liner 28a is also included. Layer 28 need not be transparent and thus it can comprise a wider variety of PSAs than layer 26. However, if the same composition is used for layer 26 and 28, manufacturing inventory can be reduced.

Radiation-curable materials that are not PSAs or PSA precursors can also be used to advantage. See, e.g., Examples 1–4 below. Such materials should have sufficient clarity to promote good retroreflectivity, have relatively low viscosity during application to the structured surface, and also have a sufficiently low shrinkage so that it maintains intimate contact with the structured surface after curing.

Transparent PSA fill materials, particularly radiation curable fill materials disclosed herein, tend to be relatively expensive compared to fill materials disclosed in the prior art. Therefore, to keep production costs down it is advantageous when using the disclosed fill materials to use relatively inexpensive thermoplastic materials for body layer and cover layer compositions. However, other materials such as radiation-curable materials are also contemplated.

Product flexibility is often desirable in sheeting applications. At the same time, the sheeting is expected to have a robust construction capable of withstanding various types of physical abuse. These conflicting requirements can be satisfied to some extent in the present constructions by the use of a fill material layer that has a relatively low elastic modulus, less than about 50,000 psi (345 MPa), and preferably less than about 25,000 psi (172 MPa), to provide flexibility. The fill material layer is sandwiched between and protected by the body layer and cover layer.

Figure 3:
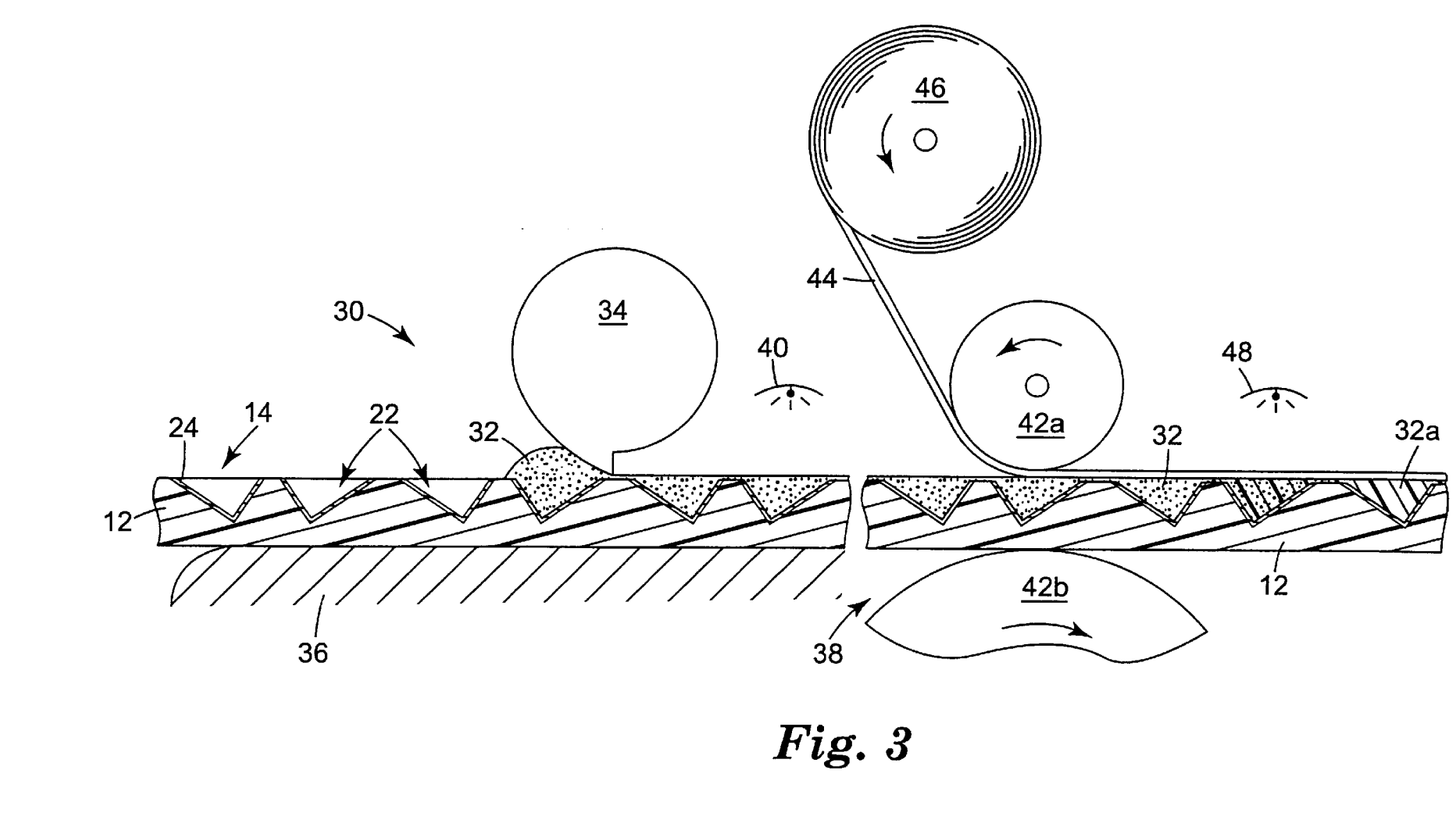
FIG. 3 depicts a process for fabricating cube corner cavity-based retroreflective sheeting.

FIG. 3 (not drawn to scale) depicts a process for making cube corner cavity-based sheeting with the preferred fill materials. Not shown in the figure, body layer 12 described above is provided the structured surface 14 by embossing, or by other processes used to make conventional rear-surface body layers. Also not shown, a film of reflective material 24 is then applied either discontinuously as shown in FIG. 2, or continuously on both the recessed faces and the top surfaces 20. It is not necessary that the structured surface 14 have top surfaces 20, although such surfaces are useful for controlling daytime appearance and, in some instances, for improved bonding. In the absence of top surfaces 20, recessed faces 18 of adjacent cube corner elements intersect to form sharp edges.

Film 24 can comprise metals such as aluminum, silver, nickel, tin, copper, or gold, or combinations thereof, or can comprise non-metals such as a multilayer dielectric stack. Such films can be applied by known physical or chemical deposition techniques, such as vacuum evaporation, sputtering, chemical vapor deposition ("CVD") or plasma-enhanced CVD, electroless deposition, and the like, depending upon the type of film desired. A given film can include multiple layers, including layers that promote adhesion to the body layer, barrier layers, and protective overcoat layers. A suitable film for polycarbonate-based body layers comprises about 1 nm thick titanium dioxide layer formed by sputtering titanium onto the body layer, followed by a 100 nm thick layer of evaporated aluminum. The titanium dioxide layer acts both as an adhesion promoter and a barrier layer to counteract pinholes typically present in the aluminum vapor coat.

The body layer 12 so prepared is then sent through a fill material application station 30. Generally, the more easily the fill material fills the cavities, the faster (and hence cheaper) the process can be run. Preferred fill materials have properties that permit rapid filling of the cube corner cavities. The fill material should adhere to the reflective film-covered recessed cube corner cavity faces without damaging the reflective film or other parts of the structured surface.

At station 30, a flowable fill material composition 32 is applied to the structured surface 14 ahead of a knife coater 34 whose position relative to a base plate 36 is adjusted to form a layer of composition 32 on the structured surface. If desired, vacuum assistance or inert gas purging can be used at the point of filling to further facilitate the operation. Some compositions 32, discussed in more detail below, have a relatively low viscosity at station 30 to permit rapid filling of the closed cube corner cavities. In contrast to prior art thermoplastic fill materials such compositions can exhibit these low viscosities at relatively low process temperatures, well below the glass transition temperature of typical body layer materials. For some fill materials, process temperatures at or around ambient room temperature are achievable.

Composition 32 is suitable for forming a fill material that bonds well to all other parts of the sheeting that it contacts, including the reflective film 24, exposed portions of the body layer 12, and any cover layer (with the exception of a release liner that may be used as a temporary cover layer).

As an aside, where a discontinuous reflective film 24 is used, some combinations of fill material and body layer material can be used to produce a covalent bond therebetween for added robustness and durability. The covalent bond between the fill material and body layer can be formed during exposure to radiation. For example, for a fill material composition comprised of 25 wt. % tetrahydofurfuralacrylate (THF acrylate), 50 wt. % Ebecryl 8402 (available from Radcure), and 25 wt. % neopentylglycoldiacrlylate, a suitable body layer can comprise an ethylenepropylenedienemonomer (EPDM) based material, such as acrylic-EPDM-styrene (AES) polymers sold under the tradename Centrex (available from Bayer), Luran (available from BASF), or other polymers that crosslink upon exposure to radiation. Such fill material reacts with these body layer materials at the top surfaces 20 upon exposure to crosslinking radiation to produce covalent bonds along the top surfaces.

Turning again to FIG. 3, after composition 32 is applied to the structured surface at fill material application station 30, the filled body layer is conveyed to a cover layer laminating station 38. For some fill materials, however, it may be desirable to apply radiation, such as with a source of radiation 40, after station 30 but before station 38. For example, some compositions 32 are composed of highly monomerized syrups which can chemically attack certain reflective films 24 or migrate through pinholes in the reflective film to attack the underlying body layer material. In such cases, it is preferable to polymerize and crosslink the compositions in situ shortly after application to the body layer so that damage to the sheeting can be minimized. However, for other compositions it is desirable that the composition 32 remain flowable at least up to the laminating station 38.

At station 38, filled body layer 12 is conveyed between pressure rollers 42a,42b rotating oppositely as shown. A cover layer 44, unwound from a roll 46, passes through the nip between the rollers and is laminated to body layer 12. The fill material, though preferably still not fully crosslinked, exhibits sufficient adhesion to hold cover layer 44 in place. The stippled appearance of composition 32 in FIGS. 3 and 4A–C indicates that it is not fully crosslinked and exhibits cold flow.

In an alternative embodiment, the composition 32 can be applied to the structured surface 14 by first being applied to the underside of the cover layer 44. Then, filling of the cube corner cavities and lamination of the cover layer can take place simultaneously at the lamination station 38.

Cover layer 44 can comprise a transparent cover layer such as layer 16, to be used in the final sheeting product, or it can comprise a temporary layer such as a release liner. In either event another source of radiation 48 can be used to crosslink composition 32 to increase its shear and adhesive strength. Such crosslinked fill material is labeled 32a and depicted as cross-hatched rather than stippled. The fill material 32a does not exhibit significant cold-flow. In a simple construction method, cover layer 44 is a transparent cover layer such as layer 16. Source 48 is sufficiently intense, and layer 44 has a low enough absorption for at least some UV wavelengths, or for e-beam radiation, so that crosslinking can be effected through the cover layer as shown. The crosslinked composition 32a aggressively bonds to reflective film 24, body layer 12, and cover layer 44. In an alternative construction method, the cover layer 44 has a higher UV absorption to better protect the remainder of the sheeting from degradation due to sunlight. Body layer 12 and reflective film 24 are then composed of materials having a lower absorption at the relevant UV wavelengths, and source 48 is disposed underneath instead of above the sheeting so as to expose the composition 32 to crosslinking radiation through body layer 12 and film 24. Silver used as reflective film 24 can be made sufficiently thin to allow adequate transmission in a UV spectral band located at about 360 nm. Alternatively, multilayer dielectric films can be easily tailored to have a high specular reflectance at the design wavelength and a transmission band in the UV.

In still another method, cover layer 44 is a release liner. The release liner is of conventional design, for example silicone-coated paper. The release liner may or may not be transparent at the design wavelength for the sheeting, and it may or may not have a low absorption of UV radiation. If absorption in the UV is low enough, source 48 can crosslink composition 32 through layer 44 as shown in FIG. 3. Otherwise, the release liner can be removed just prior to crosslinking, or source 48 can be positioned to crosslink composition 32 from below the sheeting as discussed above.

Sources 40, 48 can be adapted to emit UV light or other forms of radiation capable of carrying out the prescribed functions, for example, infrared radiation or electron beam radiation.

Still other methods contemplated herein delay application of cross-linking radiation from source 48 to take advantage of the cold flow characteristics of composition 32. For example, a temporary sheeting comprising body layer 12, cover layer 44, and fill material 32 can be manufactured as shown in FIG. 3 except that source 48 is eliminated and the temporary sheeting is wound up in a roll and placed in storage. During storage, imperfections in the fill material layer tend to disappear due to flow of the uncured composition 32 from forces such as surface tension or other forces incident to the storage environment. After a sufficient time has elapsed, the temporary sheeting can then be further processed by rapidly passing it near source 48 to expose composition 32 to radiation sufficient to produce crosslinked composition 32a, preferably a PSA. In some cases a relatively short delay may suffice, so that the temporary sheeting need not be wound up and stored.

Overall processing speed for the sheeting can be enhanced by using the delayed curing procedure just described. This is because the filling operation at station 30 can be accelerated beyond the speed at which substantially complete filling of cavities 22 is assured. Because the fill material is radiation curable, it remains in its uncured flowable state substantially indefinitely—whether for seconds, minutes, hours, or days—until crosslinking by exposure to radiation is needed. The radiation-curable materials can thus be used to improve the process of making cube corner cavity-based retroreflective sheeting, making the process faster and more robust since the degree of care needed to ensure complete filling of the cube corner cavities is not required.

Figure 4A:
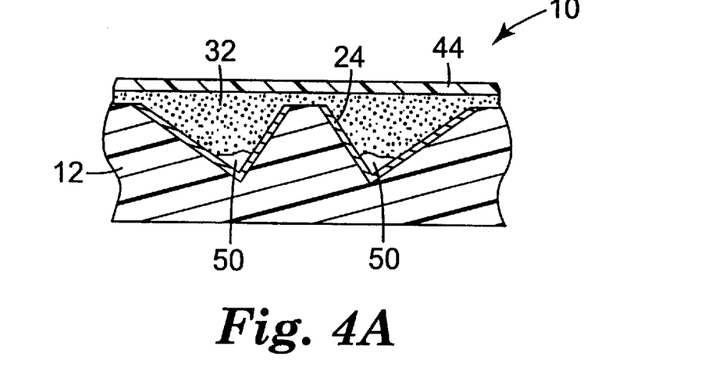
FIGS. 4A–C demonstrate a self-replicating phenomenon observed with some types of fill materials.
Figure 4B:
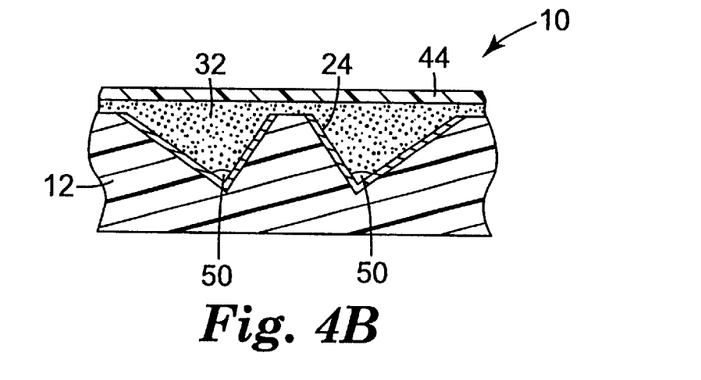
Figure 4C:
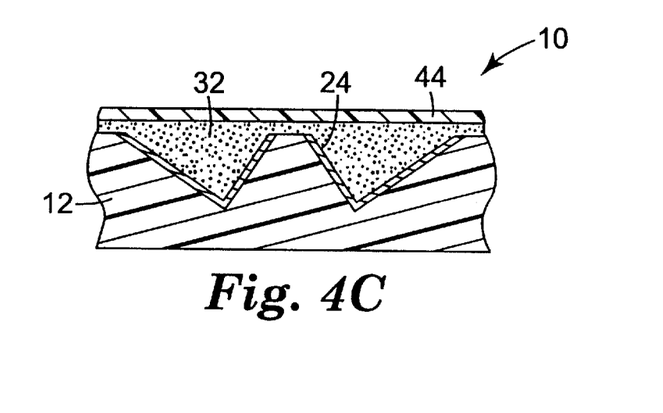

FIGS. 4A–C depict the sheeting 10 at different times after applying fill material to the structured surface 14 and after laminating cover layer 44 thereto, but before crosslinking the fill material. The production line speed of the body layer 12 has been increased to the point where complete filling of the cavities has not occurred, leaving a void 50 at the apex of each cavity. The cold flow properties of the composition 32 advantageously allow the fill material to advance into the cavities without the application of external forces and, typically, at standard process or storage temperatures, typically about 10 to about 40 degrees C. This behavior is referred to as self replication. As composition 32 advances into the cavity, voids 50 shrink (FIG. 4B), eventually disappearing altogether (FIG. 4C). Self replication via shrinkage of the voids is presumed to occur as gas in the voids diffuses into the fill material. The rate at which self replication occurs is dependent on the type of composition 32 used, the cover layer 44 properties (if a cover layer is used), the size of the cube corner cavities and the initial size of gaps 50, and on environmental factors such as temperature.

Illustrative Fill Materials

Suitable fill materials include viscoelastic polymers which can attain the requisite transparency. Preferred materials exhibit cold flow at room temperature which allows the fill material to flow into the cavities of the body layer and also allows any entrapped gas to diffuse out, thus maintaining the optical performance of the sheeting. It is desirable further that the fill material exhibit little or no shrinkage upon curing such that it maintains intimate contact with the reflective recessed faces of the structured surface.

A preferred class of materials includes acrylic polymers which may be pressure-sensitive adhesives at room temperature, or heat-activated adhesives which are substantially non-tacky at room temperature but become tacky at higher temperatures. The preferred acrylic polymers and copolymers are formed from acrylic or methacrylic acid esters of non-tertiary alkyl alcohols. The acrylic and methacrylic esters typically have a glass transition temperature below about 0° C. Examples of such monomers include n-butyl acrylate, isooctyl acrylate, 2-ethylhexyl acrylate, isononyl acrylate, isodecyl acrylate, decyl acrylate, lauryl acrylate, hexyl acrylate, and octadecyl acrylate, or combinations thereof and the like. Such monomeric acrylic or methacrylic esters are known and many are commercially available.

The acrylic polymers typically include a copolymerizable monomer having a glass transition temperature above 0° C. to enhance shear strength. Suitable copolymerizable monomers include acrylic acid, methacrylic acid, itaconic acid, n-vinyl pyrrolidine, n-vinyl caprolactam, substituted acrylamides such as N,N dimethylacrylamide, N-vinyl-2-pyrrolidone, N-vinyl caprolactam, acrylonitrile, isobornyl acrylate, tetrahydrofurfuryl acrylate, glycidyl acrylate, 2-phenoxyethylacrylate, benzylacrylate, acrylonitrile and methacrylonitrile or combinations thereof.

Typically, the amounts of acrylate monomer to copolymerizable monomer can vary from 100 to about 30 parts of acrylate and correspondingly, 0 to 70 parts of copolymerizable monomer. The specific amounts of monomers are selected for the desired end use properties.

The acrylic polymers may be prepared by emulsion polymerization, bulk polymerization, solvent polymerization, and the like, using appropriate polymerization initiators. Suitable pressure-sensitive adhesives for the invention are described in, for example, U.S. Pat. No. 5,637,646 (Ellis), U.S. Pat. No. 4,181,752 (Martens et al.), and U.S. Pat. No. Re. 24,906 (Ulrich), all incorporated herein by reference.

Various other materials may be added to tailor the characteristics of the polymer for the end use. Such materials include colorants, fluorescent dyes or pigments, chain transfer agents, plasticizers, tackifiers, antioxidants, stabilizers, cross-linking agents, and solvent.

The fill material is preferably crosslinked to provide higher shear strength. In order to maintain optical performance, it is preferred that any entrapped gas or voids be allowed to escape or collapse before the fill material is crosslinked. Suitable cross-linking agents include those that are free radically copolymerizable with the acrylate monomers, and may be activated by radiation such as ultraviolet light. Additionally, crosslinking may be effected in the absence of cross-linking agents by means such as electron beam.

When the fill material is applied to the sheeting in substantially polymeric form, e.g. as a hot melt coating, entrapped gas is allowed to diffuse, presumably into the fill material, before crosslinking. Examples of crosslinking agents suitable for this application include free-radically copolymerizable crosslinking agents such as, for example, 4-acryloxybenzophenone, para-acryloxyethoxybenophenone, and para-N-(methacryloxyethyl)-carbamoylethoxybenophenone. Copolymerizable chemical cross linking agents are typically included in the amount of about 0% to about 2%, and preferred in the amount of about 0.025% to about 0.5%, based on the total weight of monomer(s). Other useful copolymerizable crosslinking agents are described in U.S. Pat. No. 4,737,559 (Kellen et al.). The crosslinking is effected by ultraviolet light.

Alternatively, a fill material composition may be polymerized in situ in the cavities of the sheeting by coating a monomeric or oligomeric composition onto the sheeting and polymerizing the compositions with heat or radiation. In this case, the composition has a viscosity that is sufficiently low prior to polymerization that any gas such as air diffuse out of the composition quickly prior, and the composition flows rapidly and easily to fill the cavities of the sheeting. Suitable crosslinking agents include those mentioned above as well as materials that crosslink during the polymerization process. Examples of this type of crosslinking agent include multi-functional acrylates such as 1,6 hexanedioldiacrylate and trimethylolpropanetriacrylate and substituted triazines described in U.S. Pat. No. 4,330,590 (Vesley et al.) and U.S. Pat. No. 4,329,384 (Vesley at al.). These crosslinking agents may be used in amounts of from about 0.0001% to about 0.005% based on the weight of the monomers.

The fill material may be applied to the sheeting by any suitable method. For example, the polymers can be dispersed in a solvent or an emulsion, coated onto the sheeting, and drying off the solvent or water to leave the polymer in the cavities of the sheeting. The polymers may be hot melt coated onto the sheeting using known equipment such as extrusion coaters, rotary rod die coaters, and the like. The polymers may also be formed in the cavities of the sheeting as described above. Solvent-free processes are preferred because they eliminate environmental concerns associated with solvents and avoid formation of bubbles which may occur during drying of a solvent-containing composition.

Body Layer Materials and Cover Layer Materials The body layer for retroreflective sheeting as described herein can be manufactured as a unitary material, e.g. by embossing a preformed sheet with an array of cube corner elements as described above or by casting a fluid material into a mold. Alternatively, the body layer can be manufactured as a layered product by casting a layer defining the structured surface against a preformed flat film analogous to the teachings of PCT Publication No. WO 95/11464 (Benson, Jr. et al.) and U.S. Pat. No. 3,684,348 (Rowland), or by laminating a preformed film to a preformed layer having cube corner cavities. Useful body layer materials are those that are dimensionally stable, durable, weatherable, and readily formable into the desired configuration. Examples include acrylics such as Plexiglas brand resin from Rohm and Haas, thermoset acrylates and epoxy acrylates, preferably radiation cured; polycarbonates; polyolefins; polyethylene-based ionomers (marketed under the name 'SURLYN'); polyesters; cellulose acetate butyrates; and polystyrenes. Generally any material that is formable, typically under heat and pressure, can be used. The sheeting can also include colorants, dyes, UV absorbers, or other additives as desired.

Suitable transparent cover layer materials can also be of single or multilayer construction and can comprise materials that are optically transparent at least at a design wavelength and that are durable and weatherable. Thermoplastic or thermoset polymers, or combinations thereof, are generally acceptable. Acrylics, vinyl chloride, urethanes, ethylene acrylic acid (EAA) copolymers, polyesters, and fluoropolymers including polyvinylidene fluoride are preferred for weatherability. Corrosion inhibitors, UV stabilizers (absorbers), colorants including fluorescent dyes and pigments, abrasion resistant fillers, solvent resistant fillers, and the like can be included to provide desired optical or mechanical properties. The cover layer can have graphics, symbols, or other indicia so that the sheeting formed by the combination of the body layer and cover layer conveys useful information.

As discussed above, many thermoplastic polymers such as EAA, polyvinyl chloride, polystyrene, polyethylene-based ionomers, polymethylmethacrylate, polyester, and polycarbonate are as a whole relatively inexpensive and for that reason, to help offset the higher expense of typical radiation cured fill materials disclosed herein, they are desirable for use in the body layer and cover layer. The body layer also preferably has an elastic modulus greater than that of the fill material in order to maintain cube stability during deformation. The body layer elastic modulus is preferably greater than about 100,000 psi (690 MPa), measured in accordance with ASTM D882-97 "Standard Test Method for Tensile Properties of Thin Plastic Sheeting".

EXAMPLES 1–4

Four body layers were embossed with a mold to impart a structured surface similar to that shown in FIG. 1. The mold had a structured surface consisting of three sets of flat-bottomed grooves, and was the negative replica of a prior mold whose upper portions had been ground down flat with an abrasive. The embossed body layers were made of polycarbonate. The body layers for Examples 1 and 2 had a thickness of about 43 mils (1.1 mm) and included sufficient $TiO_2$ filler to make them opaque with a diffuse white surface appearance. Those for Examples 3 and 4 had a thickness of about 18 mils (0.46 mm) and included instead a red dye to give a diffuse red surface appearance. The structured surface of each body layer consisted essentially of three intersecting sets of parallel ridges. Two of the sets, referred to as "secondary" ridge sets, had uniform ridge spacings of about 16 mils (408 $\mu$m) and intersected each other at an included angle of about 70 degrees. The other set of parallel ridges, referred to as the "primary" ridge set, had a uniform spacing of about 14 mils (356 $\mu$m) and intersected each of the secondary ridge sets at an included angle of about 55 degrees. This produced cube corner cavity matched pairs canted at an angle of about 9.18 degrees. All of the ridges had substantially flat top surfaces whose transverse dimension was about 3.5 mils (89 μm) for the primary grooves and about 2.2 mils (56 μm) for the secondary grooves. The top surfaces were all non-smooth as a result of the abrasive action on the original mold discussed above, transferred to the body layers via the replication steps. The cube corner elements had a cube depth below the top surfaces of about 5.17 mils (131 μm). A silver film was vacuum deposited onto the structured surface of each sample to a thickness sufficient to render the film opaque yet highly reflective. For Examples 2 and 4, the portion of the silver film disposed on the top surfaces was removed by lightly sanding with an abrasive. The silver film for Examples 1 and 3 was left undisturbed and continuous.

A radiation-curable composition was prepared by combining (by weight) 74% Ebecryl 270 (a urethane acrylate available from Radcure), 25% Photomer 4127 (propoxylated neopently glycol diacrylate available from Henkel), and 1% Daracure 1173 (a photoinitiator available from Ciba-Geigy). This composition was then flow coated on the structured surface of all samples at room temperature to a thickness sufficient to fill the cube corner cavities and cover the top surfaces. The composition was flowable and had a viscosity of about 2000 centipoise (2 Pa-s) during filling. The samples were degassed at room temperature in a small vacuum chamber. Next, when no bubbles remained in the composition, the samples were removed from the chamber and covered with a 7 mil (178 μm) thick sheet of photograde PET sheeting to eliminate oxygen during subsequent curing. A heavy quartz plate having good transparency in the UV was placed on the PET sheeting and curing was then performed through the quartz plate and PET sheeting with UV light from a mercury lamp for about two minutes. The fill material composition had a sufficiently low shrinkage so that it hardened and bonded to the vapor-coated body layer. The composition did not bond to the PET sheeting, which was then removed. The cured composition was substantially clear and smooth but not permanently tacky. The sheetings so constructed all exhibited retroreflectivity. The coefficient of retroreflection was measured at a −4 degree entrance angle, 0 degree orientation angle, and at both 0.2 and 0.5 degree observation angles, and have not been adjusted to take into account the proportion of the structured surface actually occupied by the cube corner elements:

| Sample No. | Body layer color | Silver film on top surfaces | Retro. Coeff. (cd/lx/m$^2$) @ 0.2° | @ 0.5° |
|---|---|---|---|---|
| 1 | White | Yes | 58 | 26 |
| 2 | White | No | 46 | 22 |
| 3 | Red | Yes | 28 | 14.6 |
| 4 | Red | No | 22 | 17 |

These measurements demonstrate that the silver film imparts a high specular reflectivity to the recessed faces. Samples 2 and 4, with the silver film exposed selectively on the recessed faces, exhibited noticeable daytime color (white or red) as a result of the exposed body layer at the top surfaces.

EXAMPLES 5–16

Twelve body layers made of polystyrene (type 498 Styron brand, available from Dow Chemical Co., Midland, Mich.) were embossed with a mold to impart a structured surface consisting essentially of three intersecting sets of parallel ridges. Six of the body layers (Examples 5–10) were natural, clear polystyrene and the remaining six (Examples 11–16) used polystyrene compounded with a titanium dioxide concentrate to impart diffuse whiteness. The body layers were each about 9 mils (230 μm) thick. Two of the three sets of parallel ridges, referred to as "secondary" ridge sets, had uniform ridge spacings of about 5.74 mils (146 μm) and intersected each other at an included angle of about 70 degrees. The other set of parallel ridges, referred to as the "primary" ridge set, had a uniform ridge spacing of about 5 mils (127 μm) and intersected each of the secondary ridge sets at an included angle of about 55 degrees. This produced cube corner cavity matched pairs having a cavity depth of about 2.5 mils (64 μm) and an angle of cant of about 9.18 degrees. The ridges in each of the three ridge sets did not have top surfaces as defined herein but rather terminated at sharp upper portions whose transverse dimension was less than 0.0001 inches (2.5 μm). A continuous aluminum film about 100 nm thick was vacuum deposited onto the entire structured surface.

A transparent hot melt PSA composition was prepared according to the procedure of Example 1 of U.S. Pat. No. 5,753,768 (Ellis) except as indicated below. A 200-gallon (757 liter) stainless steel batch reactor was charged with: 441.3 kilograms of isooctyl acrylate ("IOA"); 54.4 kg of acrylic acid ("AA"); 0.0017 parts of Vazo™ 52 (2,2'-azobis (2,4-dimethylpentanenitrile)) per 100 parts of IOA and AA ("pph"); 0.0084 pph isooctylthioglycoate; 0.5 pph of a 25 weight % solids mixture of 4-acryloxy benzophenone in IOA; and 0.1 pph of Irganox™ 1010 thermal stabilizer/antioxidant (tetrakis(methylene(3,5-di-tert-butyl-4-hydroxyhydrocinnamate))methane), manufactured by Ciba-Geigy Corporation. The composition was reacted in the first adiabatic reaction cycle with the starting reaction temperature of about 60 degrees C. It reached a solids content of about 50% from the reaction.

After cooling the composition to about 55 degrees C., a mixture of 0.004 pph of Vazo™ 52, 0.004 pph of Vazo™ 88 (2,2'-azobis(cyclohexanecarbonitrile)), 0.0004 pph of di-t-butyl peroxide, 0.004 pph of t-butylperbenzoate, and 0.04125 pph isooctylthioglycoate, 0.5 pph of a 25 weight % solids mixture of 4-acryloxy benzophenone in IOA, and 4.54 kilograms of IOA was mixed into the reaction mixture.

The composition was then heated to 60 degrees C., held until polymerization began, and then reacted adiabatically. After the second adiabatic reaction cycle was completed, the resulting polymer composition had a 93% solids content.

The batch of adhesive thus produced was then vacuum stripped to provide a pressure-sensitive adhesive polymer having an inherent viscosity of 0.44 dl/g and 0.1% or less residuals. The inherent viscosity was measured by conventional methods using a Cannon-Fenske #50 viscometer in a water bath controlled at 25° C., using the flow time of 10 ml of a polymer solution (0.2 g per deciliter polymer in ethyl acetate). The test procedure followed and the apparatus used are described in *Textbook of Polymer Science,* F. W. Billmeyer, Wiley-Interscience (Second Edition, 1971), pp. 84–85.

The prepared PSA composition was substantially completely polymerized and was permanently tacky at room temperature. The composition exhibited cold flow, yet strips of it could be cut from a bulk slab with a knife.

The prepared PSA composition was then fed via a Haake 18 mm twin screw extruder into a 5 inch wide rotary rod die coater which applied the composition to the structured surface of the twelve body layers by hot melt coating. A rubber coated backup roll with a temperature varying between about 90 and 180 degrees F. (32 and 82 degrees C.) was used during this application step. The composition temperature as applied was determined by the extruder and die coater temperatures, ranging from about 325 to 375 degrees F. (163 to 191 degrees C.). Line speed of the body layer during fill material application was between about 10 and 20 ft/min (51 to 102 mm/sec). The applied composition coating was continuous and had a thickness of about 1–1.5 mils (25 to 38 μm) measured from the uppermost portions of the ridges on the structured surface. In all cases, voids between the composition and the reflective film were observed at the cavity apices indicating poor replication—the composition had not fully filled the cube corner cavities (see FIG. 4A). The voids appeared to occupy approximately 10–40% of the cube corner cavity volume. The observed retroreflectivity was poor. For Examples 5–7 and 11–13 the PSA composition was left as coated and for the other samples the composition was crosslinked by exposure to a dosage of about 440 mJ/cm$^2$ of UV light as measured with an EIT UVIMAP, NIST units calibrated in the UVA spectral range. The crosslinked composition formed a PSA with high shear and cohesive strength with little or no cold flow. Three different transparent cover layers, each about 2 mils (50 μm) thick were then laminated to the PSA composition layer of the samples at ambient room temperature—an extruded impact-modified polymethylmethacrylate (PMMA) film was laminated to Examples 5, 8, 11, and 14, a plastisol-coated plasticized polyvinyl chloride (PVC) film was laminated to Examples 6, 9, 12, and 15, and an extruded polyethylene co-acrylic acid (EAA) film was laminated to Examples 7, 10, 13, and 16.

The samples were wound up in rolls and maintained at ambient room temperature. Within several hours after lamination, the non-crosslinked samples (Examples 5–7 and 11–13) began to show significantly improved retroreflective performance indicative of the fill material flowing to more completely fill the cube corner cavities. After about 24 to 72 hours the fill material layer for those samples was substantially free of any voids. Apparently, the matter filling the voids diffused out of the sheeting during this time. The samples with the acrylic (PMMA) cover layer appeared to allow the most rapid rate of self replication; those with the EAA cover layer were somewhat slower; and those with the vinyl (PVC) cover layer yielded the slowest self replication rates of the samples tested. The crosslinked samples, however, showed no visible improvement in replication fidelity of the fill material layer even after several months of storage at ambient room temperature.

Samples similar to Examples 5, 7–11, and 13–16 were made except that the body layer comprised polycarbonate (Makrolon brand, type 2407, available from Bayer) instead of polystyrene. The results followed the same pattern as the polystyrene samples. Also, the effect of the use or non-use of reduced gas pressure at the fill material application station was investigated; no effect was noted.

The non-crosslinked samples, after complete replication of the fill material into the cube corner cavities of the structured surface, were thus ready for subsequent exposure to radiation sufficient to crosslink the fill material composition to increase its shear strength by solidification, while still maintaining its PSA characteristics. The coefficient of retroreflection was measured for all the non-crosslinked samples for −4 degree entrance angle and 0.2 degree observation angle, with values ranging from about 589 to about 982 cd/lx/m$^2$.

EXAMPLE 17

A roll of body layer retroreflective sheeting substantially the same as those of Examples 5–16 was prepared. The same structured surface geometry and reflective aluminum film was used.

A pressure-sensitive adhesive resin composition was prepared by mixing 75 parts of isooctyl acrylate and 25 parts of N-vinylcaprolactam to yield about 2000 grams. Then 0.05 pph of a photoinitiator (2,4,6-trimethylbenzoyldiphenylphosphine available as Lucirin™ TPO from BASF Corp.) was added. Nitrogen was bubbled through the composition and the composition was exposed to Sylvania black lights to partially polymerize it to a viscosity of about 1700 centipoise (1.7 Pa-s). The composition viscosity was measured using a model LVF Brookfield Viscometer equipped with a number 4 spindle at 60 rpm at room temperature. In the partial polymerization process, the temperature of the composition increased from 23° C. to about 38° C. The composition was then sparged with air and cooled to room temperature. An additional 0.15 pph of photoinitiator (Lucirin™ TPO) and 0.15 pph 1,6-hexanedioldiacrylate were added to it. The partially polymerized composition, still substantially monomeric (<10% polymerized), was knife coated onto the body layer sheeting to a thickness of about 2 mils (50 μm) measured from the uppermost portions of the ridges on the structured surface, and then exposed to ultraviolet radiation in a nitrogen atmosphere to cure (polymerize and crosslink) the adhesive in situ. The ultraviolet radiation was provided by ultraviolet black lamps having most of the light emission between 300 and 400 nanometers, and a peak emission at about 350 nanometers. The light intensity averaged about 4.9 mW/cm$^2$, and the total energy was about 498 mJ/cm$^2$. The UV light was measured with an EIT UVMAP in NIST units. Due to the low viscosity and the wetting characteristics of the composition to the aluminum vapor coat, no voids were seen in the fill material within seconds of coating at the coating speed of 20 feet per minute. After curing, the adhesive was covered with a silicone-coated polypropylene release liner.

Afterwards the release liner was removed and a transparent cover layer of PMMA film similar to those used in Examples 5, 8, 11, and 14 about 2 mils (50 μm) thick, was laminated to the pressure-sensitive adhesive on the body layer to produce a sheeting construction. This Example 17 exhibited a good coefficient of retroreflectivity: the average value of measurements taken at 0 and 90 degree orientation angles, at a −4 degree entrance angle and 0.2 degree observation angle, was 1002 cd/lx/m$^2$.

GLOSSARY OF SELECTED TERMS

"Adhesive" means a substance suitable for bonding two substrates together by surface attachment.

The "body layer" of a retroreflective sheet or article that uses a structured surface for retroreflection is the layer (or layers) possessing the structured surface and chiefly responsible for maintaining the integrity of such structured surface.

"Cold flow" refers to the ability of a material to flow under its own weight at ambient room temperature, about 20 degrees C.

"Cube corner cavity" means a cavity bounded at least in part by three faces arranged as a cube corner element.

"Cube corner element" means a set of three faces that cooperate to retroreflect light or to otherwise direct light to a desired location. "Cube corner element" also includes a set of three faces that itself does not retroreflect light or otherwise direct light to a desired location, but that if copied (in either a positive or negative sense) in a suitable substrate forms a set of three faces that does retroreflect light or otherwise direct light to a desired location.

"Cube corner pyramid" means a mass of material having at least three side faces arranged as a cube corner element.

"Cube height" or "cube depth" means, with respect to a cube corner element formed on or formable on a substrate, the maximum separation along an axis perpendicular to the substrate between portions of the cube corner element.

"Diffusely reflective", "diffuse reflectivity", and cognates thereof mean the property of reflecting a collimated incident light beam into a plurality of reflected light beams. Surfaces that are diffusely reflective also have a low specular reflectivity.

"Flowable" refers to the ability of a material to flow under its own weight at a given temperature.

"Geometric structure" means a protrusion or cavity having a plurality of faces.

"Groove" means a cavity elongated along a groove axis and bounded at least in part by two opposed groove side surfaces.

"Groove side surface" means a surface or series of surfaces capable of being formed by drawing one or more cutting tools across a substrate in a substantially continuous linear motion. Such motion includes fly-cutting techniques where the cutting tool has a rotary motion as it advances along a substantially linear path.

"Heat-activated adhesive" means a solid thermoplastic material that melts upon heating and then sets to a firm bond upon cooling.

"X% polymerized" means 100% minus the weight % of unreacted monomer in a composition.

"Pressure-sensitive adhesive" (abbreviated "PSA") means a permanently tacky material capable of adhering to surfaces upon applying at least a slight amount of manual pressure.

"Radiation curable" means the capacity of a composition to undergo polymerization and/or crosslinking upon exposure to ultraviolet radiation, visible radiation, electron beam radiation, or the like, or combinations thereof, optionally with an appropriate catalyst or initiator.

"Retroreflective" means having the characteristic that obliquely incident incoming light is reflected in a direction antiparallel to the incident direction, or nearly so, such that an observer at or near the source of light can detect the reflected light.

"Structured" when used in connection with a surface means a surface composed of a plurality of distinct faces arranged at various orientations.

"Symmetry axis" when used in connection with a cube corner element refers to the axis that extends through the cube corner apex and forms an equal angle with the three faces of the cube corner element. It is also sometimes referred to as the optical axis of the cube corner element.

"Transparent", with regard to a layer or substance for use in a retroreflective sheeting, means able to transmit light of a desired wavelength to a degree that does not prevent retroreflection.

"Top surfaces" of a structured surface that also contains recessed faces refers to surfaces that are distinct from the recessed faces and that have a minimum width in plan view of at least about 0.0001 inches (2.5 µm).

"Viscosity" means the internal resistance to flow exhibited by a fluid at a given temperature. Low to moderate viscosities are typically measured using a rotating spindle in contact with the fluid and expressed in SI units of Pascal-seconds (Pa-s). The viscosity of highly viscous polymers can be measured by dissolving the polymer in a solvent and comparing the efflux times, as described in *Textbook of Polymer Science*, F. W. Billmeyer, Wiley-Interscience (Second Edition, 1971), pp. 84–85. A viscosity measured by the latter approach is referred to as "inherent viscosity" and expressed in units of inverse concentration, such as deciliters per gram (dl/g).

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A retroreflective article, comprising:

a body layer having a structured surface comprising recessed faces that define cube corner cavities, and a top surface having a width between the recessed faces;

a reflective film disposed at least on the recessed faces; and a transparent adhesive layer that fills the cube corner cavities.

2. The article of claim 1, wherein the adhesive layer comprises a transparent pressure-sensitive adhesive.

3. The article of claim 1, wherein the adhesive layer comprises a transparent heat-activated adhesive.

4. The article of claim 2, wherein the pressure-sensitive adhesive comprises a crosslinked polymer.

5. The article of claim 1, wherein the adhesive layer is substantially coextensive with the structured surface.

6. The article of claim 5, further comprising:

a release liner that contacts the adhesive layer.

7. The article of claim 5, further comprising:

a transparent cover layer that contacts and bonds to the adhesive layer.

8. The article of claim 7, wherein the transparent cover layer comprises a thermoplastic polymer.

9. The article of claim 7, wherein the body layer comprises a thermoplastic polymer.

10. The article of claim 7, wherein the adhesive layer has a lower elastic modulus than that of the body layer.

11. The article of claim 10, wherein the elastic modulus of the adhesive layer is less than about 345 MPa and the elastic modulus of the body layer is greater than about 690 MPa.

12. The article of claim 5, wherein the adhesive layer is substantially continuous such that it covers both the cube corner cavities and upper portions of the structured surface.

13. The article of claim 1, wherein the reflective film is discontinuous.

14. The article of claim 1, wherein the body layer also has a rear surface opposite the structured surface, the article further comprising:

a second pressure-sensitive adhesive layer disposed at the rear surface.

15. A retroreflective article, comprising:
  a body layer having a structured surface comprising recessed faces that define cube corner cavities, and a top surface having a width between the recessed faces;
  a reflective film disposed at least on the recessed faces; and
  a layer of flowable radiation-curable composition that fills the cube corner cavities.

16. The article of claim 15, wherein the composition layer is substantially coextensive with the structured surface.

17. The article of claim 16, wherein the composition layer covers substantially all of the structured surface.

18. The article of claim 15, wherein the composition is substantially polymeric.

19. The article of claim 15, wherein the composition is suitable for forming a transparent pressure-sensitive adhesive.

20. The article of claim 15, wherein the composition has a sufficiently low shrinkage such that upon curing it maintains intimate contact with the recessed faces.

21. The article of claim 15, wherein the reflective film is discontinuous, and the composition is suitable for forming a covalent bond with exposed portions of the body layer.

* * * * *

UNITED STATES PATENT AND TRADEMARK OFFICE
CERTIFICATE OF CORRECTION

PATENT NO.    : 6,280,822 B1
DATED         : August 28, 2001
INVENTOR(S)   : Smith, Kenneth L.

It is certified that error appears in the above-identified patent and that said Letters Patent is hereby corrected as shown below:

<u>Title page,</u>
Item [75], Inventors, delete "Michael A. Craton, Cottage Grove; Michael P. Daniels, Inver Grove Heights; Roger E. Luehrs, Arden Hills,"

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,280,822 B1  
DATED : August 28, 2001  
INVENTOR(S) : Smith, Kenneth L.

Page 1 of 1

It is certified that error appears in the above-identified patent and that said Letters Patent is hereby corrected as shown below:

<u>Title page,</u>
Item [75], Inventors, delete "Michael A. Craton, Cottage Grove; Michael P. Daniels, Inver Grove Heights; Roger E. Luehrs, Arden Hills,"

Signed and Sealed this

Third Day of August, 2004

JON W. DUDAS
*Acting Director of the United States Patent and Trademark Office*